Dec. 14, 1965  M. M. IGLEHART  3,223,367
SNAP-IN MOUNTING MEANS
Filed April 7, 1964
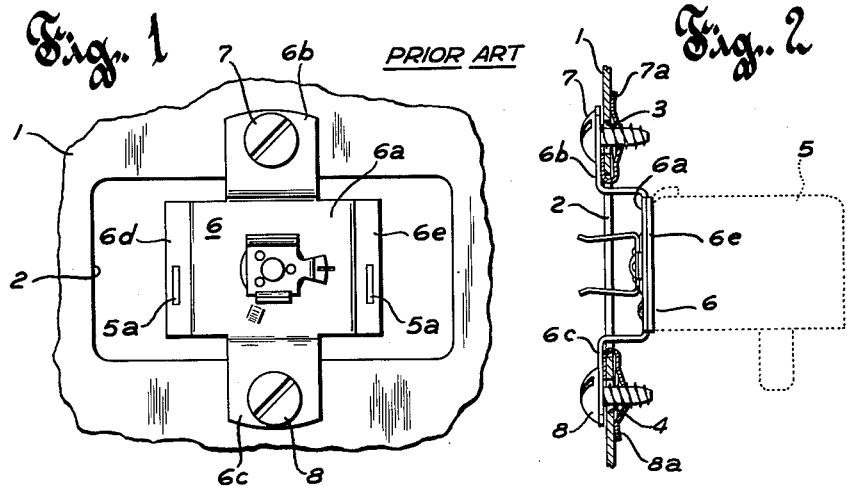
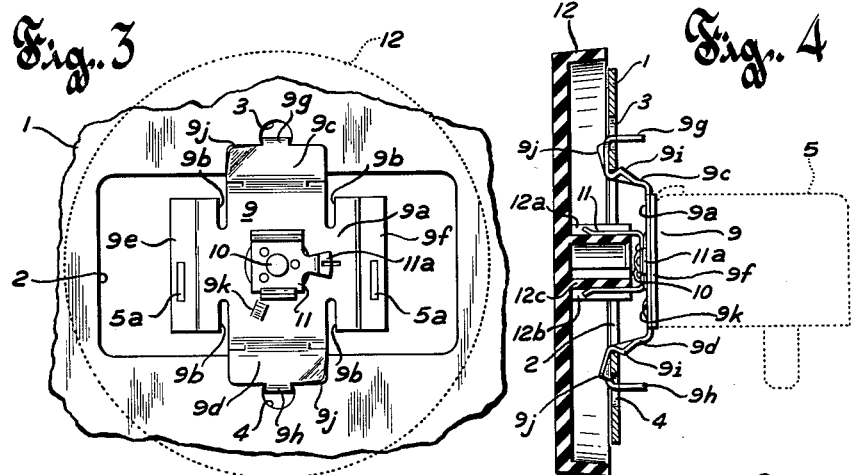
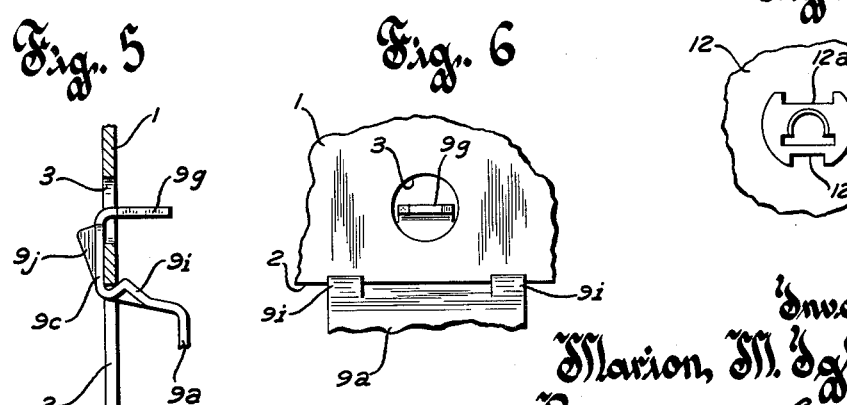
Inventor
Marion M. Iglehart
By Wm. A. Autio
Attorney United States Patent Office 3,223,367
Patented Dec. 14, 1965

3,223,367
SNAP-IN MOUNTING MEANS
Marion M. Iglehart, Wauwatosa, Wis., assignor to Cutler-Hammer, Inc., Milwaukee, Wis., a corporation of Delaware
Filed Apr. 7, 1964, Ser. No. 357,990
11 Claims. (Cl. 248—27)

This invention relates to snap-in mounting means and more particularly to snap-in means for rigidly securing an electrical device or the like in an aperture in a mounting panel.

While not limited thereto, the invention is especially applicable to converting a refrigerator control from screw-mounted type to snap-in mounted type without modification of the mounting panel.

An object of the invention is to provide an improved snap-in mounting means.

A more specific object of the invention is to provide improved means for securing an electrical device in a snap-in fashion onto a mounting panel originally adapted for a screw-mounted device.

Another specific object of the invention is to provide an improved mounting plate for converting a device from screw-mounted to snap-in mounted type without modifying its mounting panel or the mounting holes therein.

Another specific object of the invention is to provide an improved snap-in mounting means of simplified construction which avoids the requirement for screws and nuts as securing means.

Another specific object of the invention is to provide an improved snap-in mounting bracket for a rotary knob operated control device which will not become dislodged from its mounting panel even if extreme rotary force is applied to the knob.

Another specific object of the invention is to provide an improved one-piece snap-in bracket for mounting a control device to a panel aperture originally constructed for a screw-mounted device without additional parts or spring members.

Another specific object of the invention is to provide an improved snap-in mounting bracket for a control device which is constructed of cold rolled metal and is provided with a configuration which utilizes its inherent resilience to afford the snap-in feature thereby avoiding the need for higher cost spring metal therein.

Another specific object of the invention is to provide an improved one-piece snap-in bracket for mounting a control device having means to keep flexing to a minimum whereby it can be made of cold rolled metal rather than spring metal.

Another specific object of the invention is to provide an improved one-piece mounting plate for converting an electrical control device from screw-mounted to snap-in mounted type and having means for utilizing the screw holes in the mounting panel to advantage.

A further specific object of the invention is to utilize the aperture and screw holes in a mounting panel adapted for a screw-mounted device for rigidly securing thereto and locating a snap-in device.

Other objects and advantages of the invention will hereinafter appear.

According to the invention, there is provided a snap-in mounting plate for a refrigerator control device. This mounting plate is constructed for snap-in securing to the aperture and screw holes in an interior side panel of a refrigerator cabinet which were adapted for accommodating a screw-mounted control. This mounting plate is provided with a pair of projections for entering the two screw holes in the panel to position the control device in the center of the aperture. Nibs on the upper and lower portions of the mounting plate engage the edges of the aperture rigidly to secure the same to the panel. A pair of corners of the mounting plate are bent away from the panel to facilitate insertion of a screwdriver to remove the device from the panel. The mounting plate or bracket is of a one-piece construction and is provided with a configuration providing certain advantages at low cost. The forwardly extending arms have sufficient inherent resiliency or flexibility to afford the snap-in function so that it can be made of relatively low cost material such as cold rolled steel, rather than the higher cost spring steel. The nibs on the arms which snap behind the rear edges of the aperture in the panel are provided with sloping sides so that the bracket will adjust to and accommodate variations in the thickness of the panel and the paint thereon and will provide a good snap-in engagement. The tongues which extend through the screw holes in the panel are made long enough so that the bracket will not come loose from the panel if extreme or excessive force is applied to turning of the knob against the stop. The taper on the tongues facilitates insertion thereof into the screw holes in the mounting panel.

These and other objects and advantages of the invention and manner of obtaining them will best be understood by reference to the following description of an embodiment of snap-in mounting means taken in conjunction with the accompanying drawings, wherein:

FIGURES 1 and 2 are front elevational and right side views, respectively, of a prior art screw-mounted refrigerator control device;

FIGS. 3 and 4 are front elevational and right side views, respectively, of a snap-in mounting means constructed in accordance with the invention;

FIGS. 5 and 6 are enlarged right side and rear views of a fragmentary upper portion of the snap-in mounting means of FIGS. 3 and 4; and FIG. 7 is a fragmentary rear view of the operating knob.

The prior art device shown in FIGS. 1 and 2 will first be described in order to afford an understanding of the converting capabilities of the invention shown in FIGS. 3 to 6.

As shown in FIGS. 1 and 2, the prior art mounting panel 1 which may be an interior wall of a refrigerator is provided with an aperture 2 and a pair of screw holes 3 and 4. Aperture 2 is of a universal size, that is, large enough to receive the largest one of a number of different sizes of refrigerator control devices. Aperture 2 is rectangular in shape having its longer dimension arranged horizontally and screw holes 3 and 4 are respectively above and below aperture 2 in the panel at the horizontal midpoint of aperture 2 so that the control device mounted therein will be centered in the aperture.

As shown in FIGS. 1 and 2, refrigerator control device 5 which is a temperature control device or the like is provided with a mounting bracket or plate 6. This mounting plate has a rectangular middle portion 6a and upper and lower offset arms 6b and 6c. The lateral end portions 6d and 6e are slightly offset rearwardly so that the rectangular midportion matches the forward contour of device 5. These lateral end portions are each provided with a narrow slot for receiving interfitting projections 5a of device 5 to secure the latter to the mounting plate. Projections 5a may be peened over or welded in the slots rigidly to secure the control device to the mounting plate.

As shown in FIG. 2, arms 6b and 6c extend forwardly from the upper and lower edges of middle portion 6a and are bent up and down, respectively, to overlie holes 3 and 4 in the panel 1. Arms 6b and 6c are provided with holes in registration with the holes in the panel for receiving securing screws 7 and 8 therethrough. Speed nuts 7a and 8a are slipped over the edges of aperture 2 into registration with holes 3 and 4. The U-shaped portions of these speed nuts grip the edges of aperture 2, to hold them in place. The screws extend through the holes in arms 6b and 6c and holes 3 and 4 and are threaded into these speed nuts to secure the control device to the panel.

The invention shown in FIGS. 3 to 6 comprises a modified mounting bracket or plate 9 affording snap-in assembling or mounting of control device 5 in aperture 2 on panel 1. Aperture 2 and screw holes 3 and 4 in FIGS. 3 to 6 are the same size as those in FIGS. 1 and 2 and require no modification to accommodate the snap-in mounting plate.

Mounting plate 9 is provided with a portion secured to control device 5 such as a rectangular middle portion 9a similar to portion 6a in FIG. 1 except that this middle portion is provided with slots 9b. A pair of such slots is provided on the upper edge of the rectangular middle portion and another pair of slots on the lower edge thereof, one on each side of the upper and lower offset arms 9c and 9d to enhance the resiliency of these arms. While slots 9b have been shown for exemplary purposes, it will be apparent that other means such as intermediate cutout portions could be used to provide resiliency in the arms. The lateral ends 9e and 9f of the rectangular middle portion 9a are rearwardly offset like those in FIG. 1 and secured in a similar manner at slots and projections 5a to the control device 5.

As shown in FIGS. 4 and 5, arms 9c and 9d extend substantially forwardly and are bent upwardly and downwardly, respectively, to overlie the portions of the panel between aperture 2 and screw holes 3 and 4. The substantially forwardly extending portions of the arms are at a small outward angle from a straight forward direction to provide for the snap-in feature hereinafter described. The ends of the arms are provided centrally thereof with narrow prongs or strips 9g and 9h bent rearwardly. As shown in FIGS. 4 and 5, bent back strips 9g and 9h are tapered and enter screw holes 3 and 4, respectively, to position the control device centrally in aperture 2 since the aperture is much larger than the control device. Each of the two substantially forwardly extending portions of the arms is provided with a pair of projections or nibs 9i adjacent the opposite edges of the arm. These nibs have sloped sides to accommodate varying thickness of panel and paint thereon and are spaced from the panel-overlying portions of the arms by approximately the thickness of the panel. As will be apparent, when strips 9g and 9h are pressed into the screw holes in the panel, nibs 9i engages the opposite edges of aperture 2 and are cammed over these edges so that the overlying portions 9c and 9d engage the front face of the panel and the sloping sides of the nibs engage the rear corner of the edge. The inherent flexibility of the arms maintain the mounting plate rigidly secured to the panel without any other securing means being required. The construction shown keeps flexing of the arms to a minimum thereby allowing use of cold rolled steel for the snap-in bracket rather than higher price spring steel.

One corner of each overlying portion of each arm is bent away from the panel at a small angle as shown at 9j in FIGS. 3 and 5. Such raised corner affords insertion of a tool such as a screwdriver under the corner to pry the mounting plate loose from the panel when it is desired to remove the same.

The operating member 10 for the control device extends forwardly through the center of the rectangular portion of the mounting plate as shown in FIG. 3. To afford rotation of this operating member to set the control device for a desired temperature to be maintained, the operating member 10 has rigidly secured to the forward end thereof a U-shaped knob-gripping member 11 shown in FIG. 4. This U-shaped member is riveted at its middle to the operating member and the two arms extend forwardly into opposed grooves 12a and 12b in the hub or center shank 12c of knob 12 thereby to grip such hub and to secure the knob to the control device as shown in FIG. 4. Member 11 is provided with a projection 11a, shown in FIG. 3, on one side for engaging a stop 9k in mounting plate 9 to limit rotation of the operating member from its "off" position through a plurality of "on" positions to its "full on" position. As shown in dotted lines in FIG. 3, the round knob is large enough to cover aperture 2 in the refrigerator wall. The upper arm of U-shaped member 11 is wider than the lower arm thereof as shown in FIG. 3. To cause assembly of the knob 12 always in the correct angular relation with respect to the control device, groove 12a is made wider than groove 12b in shank 12c of the knob as shown in FIG. 7. Thus, the wider arm will enter only the wider groove and the narrower arm will enter the narrower groove.

The invention has a number of advantages over screw-mounted devices and other types. It reduces assembly time and cost since it can be snapped in the aperture rapidly. It eliminates the need for tools such as a screwdriver required to secure prior art devices. It positions the control device in the center of the aperture and maintains it there so that the knob will cover the aperture when inserted in place. It provides a strong and secure mounting so that the control device will not come loose from the panel under shock or vibration or excessive turning force against the stop. It provides for rapid removal of the control device when desired by the use of any flat instrument, and the need for two screws and two speed nuts is eliminated, thus reducing cost.

While the invention hereinbefore described is effectively adapted to fulfill the objects stated, it is to be understood that I do not intend to confine my invention to the particular preferred embodiment of snap-in mounting means disclosed, inasmuch as it is susceptible of various modifications without departing from the scope of the appended claims.

I claim:

1. In an apparatus for converting an electrical control device from a screw-mounted type to a snap-in mounted type without changing the construction of the panel on which it is adapted to be mounted, the panel having an aperture adapted for receiving any one of a number of different sizes of control devices therethrough and small holes on opposite sides of the aperture originally adapted for receiving screws to secure lateral arms of a screw-mounted control device supporting member to the panel:

a snap-in mounting device adapted to be substituted for the screw-mounted member and to be snap-mounted on the panel comprising:

first means substantially in a first plane and including means for securing the same to an electrical device;

a pair of arms extending from the plane of said first means and having end portions in a common plane offset from said first plane, said end portions being adapted to overlie the panel between the aperture and screw holes thereof;

prongs extending from the ends of said arms adapted to receive into the screw holes to position said mounting device in the center of the aperture and to prevent turning thereof;

and means on said arms adapted to engage the edges of the aperture and snap thereover when said end portions are pressed against the panel from one side thereof and to allow removal from the same side of the panel by prying said arms therefrom.

2. The invention defined in claim 1, together with means on said end portions affording insertion of a tool to pry said mounting device loose from the panel.

3. An apparatus for converting an electrical device from the screw-mounted type to a snap-in mounted type without changing the size or configuration of the aperture in the panel in which it is adapted to be mounted, the panel having a rectangular aperture adapted for insertion of an electrical device therethrough and small holes on opposite sides of the aperture at the center of and adjacent the longer sides of the aperture which were originally adapted for receiving screws to secure lateral side flanges of a screw-mounted member in overlying relation to the panel:

a snap-in mounting member adapted to be snap-mounted into the panel aperture comprising:
    substantially planar means adapted to be secured to the electrical device;
    forwardly extending arms on opposite sides of said planar means having end portions bent in opposite directions into a common plane parallel to said planar means, said bent end portions being adapted to overlie the portions of the panel between the sides of the aperture and the screw holes;
    rearwardly extending tongues on said bent end portions adapted for extending through the screw holes to position said member in the center of the aperture;
    and means on said arms adapted to engage the edges of the aperture and snap thereover when said bent end portions are pressed against the panel from one side thereof and to allow removal from the same side of the panel by prying said end portions therefrom.

4. The invention defined in claim 3, wherein at least one of said bent end portions is provided with a bent corner extending at a small angle away from the panel to facilitate insertion of a screwdriver to pry said mounting member loose from the panel.

5. The invention defined in claim 3, wherein said forwardly extending arms diverge at a small angle relative to one another.

6. The invention defined in claim 3, wherein said means on said arms which are adapted to engage the edges of the aperture comprise:
    nibs partly sheared and partly depressed from the opposite side portions of said arms to form projections adapted for camming over the edges of the aperture.

7. The invention defined in claim 6 wherein:
    said nibs are provided with sloping sides adapted to accommodate different thicknesses of panel and the paint thereon.

8. The invention defined in claim 3, wherein said tongues are tapered to facilitate insertion thereof into the screw holes in the panel.

9. A snap-in mounting member for a control device adapted for rigidly mounting to a panel having an aperture larger than the control device and a small screw hole on each side of the aperture in the panel; said member comprising:
    a mounting bracket comprising a first pair of substantially flat arms extending in opposite directions in a first plane and having means for securing the same to a control device;
    a second pair of substantially flat but bent arms extending laterally from said first pair of arms in opposite directions;
    said arms of said second pair being bent to extend almost perpendicularly up from the plane of said first pair of arms;
    the end portions of the arms of said second pair being bent into a second plane parallel to said first plane so that they extend in opposite directions;
    a pair of tongues extending from the extreme ends of the arms of said second pair respectively and being bent back toward said first plane and being adapted for entry into the small screw holes in the mounting panel;
    and nibs formed on the outer surfaces of said almost perpendicularly extending portions of said second pair of arms adapted for engaging the edges of the panel and snapping behind such edges when said end portions are pressed against the front face of the panel and to allow removal from the front of the panel by prying said end portions therefrom.

10. A snap-in mounting bracket for a control device adapted to be rigidly mounted in an aperture in a panel, the panel also having a small screw hole on each of two opposite sides of the aperture, said bracket comprising:
    a sheet member having a midportion provided with means for rigidly securing the same to a control device;
    lateral portions extending from opposite edges of said midportion and being bent to extend almost perpendicularly to one side of the plane of said midportion whereby said lateral portions diverge at a small angle;
    nibs formed onto said diverging portions adapted for engaging and camming over opposite edges of the aperture in the panel when the control device and bracket are pressed thereinto and for camming out of the aperture when said bracket is pried from the panel;
    the ends of said lateral portions beyond said nibs being bent to extend in opposite directions in a common plane;
    and tongues bent back from said ends of said lateral portions adapted for entry in the small screw holes in the panel to position the control device centrally of the aperture in the panel.

11. The invention defined in claim 10, wherein;
said nibs are provided with sloping sides adapted for camming over the edges of the aperture and for accommodating different thicknesses of panel;
and said nibs and said almost perpendicular portions maintaining flexing to a minimum whereby said mounting bracket may be made of one piece of cold rolled metal.

References Cited by the Examiner
UNITED STATES PATENTS

| | | | |
|---|---|---|---|
| 2,207,507 | 7/1940 | Douglas | 340—381 |
| 2,632,615 | 3/1953 | Churchill | 248—27 |
| 2,643,839 | 6/1953 | Sislik | 248—27 |
| 2,798,271 | 7/1957 | Flora | 24—73 |
| 2,803,416 | 8/1957 | Beflien | 248—26 |
| 3,101,922 | 8/1963 | Moody et al. | 248—27 |

FOREIGN PATENTS 488,161    7/1938    Great Britain.

References Cited by the Applicant
UNITED STATES PATENTS 1,933,358    10/1933    Almcrantz.

CLAUDE A. LE ROY, *Primary Examiner.*

FRANK L. ABBOTT, *Examiner.*

R. P. SEITTER, *Assistant Examiner.*